UNITED STATES PATENT OFFICE.

CHARLES DE LA HARPE, OF BASLE, SWITZERLAND, ASSIGNOR TO L. DURAND, HUGUENIN & CO., OF SAME PLACE, ST. FONS, FRANCE, AND HÜNINGEN, GERMANY.

BLUE DYE.

SPECIFICATION forming part of Letters Patent No. 585,934, dated July 6, 1897.

Application filed January 15, 1896. Serial No. 575,622. (Specimens.) Patented in France July 4, 1893, No. 231,316; in England July 4, 1893, No. 24,802, and August 7, 1894, No. 15,064, and in Germany October 6, 1893, No. 77,452, and July 29, 1894, No. 79,339.

*To all whom it may concern:*

Be it known that I, CHARLES DE LA HARPE, a citizen of the Swiss Republic, residing at Basle, Switzerland, have invented certain Improvements in the Manufacture of Blue Coloring-Matters, (which have been patented in France by Letters Patent No. 231,316, dated July 4, 1893, and Letters Patent of Addition dated July 30, 1894; in England by Letters Patent No. 24,802, dated July 4, 1893, and No. 15,064, dated August 7, 1894, and in Germany by Letters Patent No. 77,452, dated October 6, 1893, and No. 79,839, dated July 29, 1894,) of which the following is a clear and complete specification.

I have discovered that the leuco body described in Letters Patent No. 547,173, dated October 1, 1895, and obtained by the condensation of a phenol, as, for instance, resorcin, with a gallocyanin dye resulting from the action or hydrochlorate of nitrosodialkylananilin or of hydrochlorate of dialkylamidoazo-benzene upon gallic acid or its derivatives, gives by oxidation of its alkaline solution in the air and the subsequent transformation of the product of oxidation thus obtained into sulfo acid, or by oxidation of the alkaline solution of the sulfo derivative of said leuco body in the air, a blue coloring-matter having a great affinity for metallic mordants, especially for those of chromium.

The production of the new coloring-matter will be clearly understood from the following example:

*Example: Production of the coloring-matter by the oxidation of the sulfo derivative of the leuco body obtained by the combination of resorcin with the gallocyanin dye resulting from the condensation of gallamic acid with the hydrochlorate of diethylamidoazo-benzene or the hydrochlorate of nitrosodiethylanilin.*—One part of the leuco body obtained, according to the example II described in Letters Patent No. 547,173, by the combination of resorcin with the product of condensation of gallamic acid with hydrochlorate of diethylamidoazo-benzene or hydrochlorate of nitrosodiethylanilin is heated with five parts of sulfuric acid of 95 per cent. at a temperature of 75° to 80° centigrade. The sulfo derivative thus obtained is isolated and dissolved in ten parts of water and two to three parts of caustic soda of 40° Baumé. By stirring this solution in contact with air the solution turns rapidly blue, and the oxidation is stopped as soon as the blue coloration ceases to increase. The new coloring-matter formed is then precipitated by adding the quantity of hydrochloric acid necessary for the saturation of the caustic soda employed, filtered, washed, and dried, or employed in form of a paste. This new coloring-matter is insoluble in water and produces in an acid bath blue shades of color on non-mordanted wool and also on chrome mordants. It can also be employed for dyeing vegetable fibers previously mordanted and for printing. It is only slightly soluble in alcohol and in diluted hydrochloric acid, dissolves in concentrated sulfuric acid with a blue coloration, which by the addition of traces of nitric acid to the dissolution turns first to red and then to orange.

In caustic alkalies and alkaline carbonates the coloring-matter dissolves with a blue-violet coloration and gives alkaline salts which are easily soluble in water.

By the addition of a solution of sulfurous acid to an aqueous solution of an alkaline salt of the new coloring-matter the leuco body from which the new coloring-matter is derived is precipitated as a brown-green powder.

The coloring-matter can be sold in the state of an alkaline salt, as a sodic salt, for example. Its alkaline salts dissolve in sodium acetate with a blue coloration. The dye can also be prepared by oxidizing first the leuco body itself and subsequently transforming by sulfonation the product of oxidation thus obtained into sulfo-acid. For this sulfonation of the product of oxidation of the leuco body it will be desirable to employ more concentrated sulfuric acid than for the sulfonation of the leuco body itself—as, for instance, fuming sulfuric acid. This mode of treating the leuco body by oxidizing it before sulfonation is merely a reversal of the steps of the process first described and amounts to an equivalent of said process.

Any leuco body derived from resorcin and a gallocyanin dye resulting from the action of hydrochlorate of nitrosodialkylanilin or of hydrochlorate of dialkylamidoazo-benzene upon gallic acid or its derivatives can be substituted for the leuco body specified in the foregoing example.

Having thus described my invention, I claim—

1. The herein-described process for the production of a blue coloring-matter from the leuco body produced by the condensation of resorcin with a gallocyanin dye, which consists in sulfonating the said body with sulfuric acid, then subjecting an alkaline solution of the sulfo derivative obtained to contact with the air and then precipitating the blue coloring-matter with sufficient acid to neutralize the alkali employed, as set forth.

2. The herein-described process for the production of a blue coloring-matter from the leuco body produced by the condensation of resorcin with a gallocyanin dye, which consists in sulfonating the said body with sulfuric acid, then subjecting an alkaline solution of the sulfo derivative obtained to contact with the air, then precipitating the product of oxidation with sufficient acid to neutralize the alkali employed, and finally transforming the product of oxidation into an alkaline salt, by its combination with an alkali, as set forth.

3. As a new article of manufacture, the herein-described sulfonated coloring-matter derived from the leuco body produced by the condensation of resorcin with a gallocyanin dye, which dyes non-mordanted wool and chromed wool and mordanted vegetable fibers a blue color, which dissolves in concentrated sulfuric acid with a blue coloration, which by addition of traces of nitric acid turns first to red and then to orange, which is only slightly soluble in alcohol and diluted hydrochloric acid, is soluble in the form of its alkaline salts in sodium acetate with a blue coloration, is soluble in alkalies and alkaline carbonates with a blue-violet coloration, and regenerating, by adding sulfurous acid to its alkaline solutions, the leuco body from which it is derived in the form of a brown-green powder.

In witness whereof I have hereunto signed my name in the presence of two subscribing witnesses.

CHARLES DE LA HARPE.

Witnesses:
AMAND RITTER,
GEORGE GIFFORD.